United States Patent
Niedermair et al.

(10) Patent No.: US 12,415,241 B2
(45) Date of Patent: Sep. 16, 2025

(54) SEALANT APPLICATION STATION AND ASSEMBLY SYSTEM FOR CONNECTING COMPONENTS

(71) Applicant: Premium Aerotec GmbH, Augsburg (DE)

(72) Inventors: Matthias Niedermair, Augsburg (DE); Lucas Kiefer, Augsburg (DE); Tobias Kugelmann, Augsburg (DE); Markus Wickenburg, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 324 days.

(21) Appl. No.: 18/144,442

(22) Filed: May 8, 2023

(65) Prior Publication Data
US 2023/0364724 A1 Nov. 16, 2023

(30) Foreign Application Priority Data
May 9, 2022 (DE) .................. 10 2022 111 518.6

(51) Int. Cl.
*B23P 19/04* (2006.01)
(52) U.S. Cl.
CPC .................... *B23P 19/04* (2013.01)
(58) Field of Classification Search
CPC ..... B23P 19/001; B23P 19/005; B23P 19/006; B23P 19/06; B21J 15/10; B21J 15/12; B21J 15/142; B21J 15/30–32; B21J 15/38; B05B 13/0228; B05B 13/0242; B05C 5/022; B05C 13/02; B05C 13/025
See application file for complete search history.

(56) References Cited

U.S. PATENT DOCUMENTS

| | | | |
|---|---|---|---|
| 5,647,111 A * | 7/1997 | Zienkiewicz | B05C 5/0208 29/34 B |
| 6,550,359 B1 * | 4/2003 | Graham | B25B 27/0014 81/57.37 |
| 6,949,057 B2 * | 9/2005 | Everson | B23Q 3/15713 483/900 |

(Continued)

FOREIGN PATENT DOCUMENTS

JP 3841187 B2 11/2006

OTHER PUBLICATIONS

Extended European Search Report for Application No. 23172100.2 dated Oct. 2, 2023, 4 pages, [See p. 2, categorizing the cited references].

*Primary Examiner* — Christopher M Koehler
(74) *Attorney, Agent, or Firm* — Lerner David LLP

(57) ABSTRACT

An assembly system with a sealant application station and an assembly tool is described. The assembly system is used to connect two or more components to each other. The sealant application station applies a sealant to a connector. The sealant application station is arranged in a feed system for the connectors. The sealant-applied connectors are transferred to the assembly tool. The assembly tool contains a drill spindle in which a connector and a drill can be axially aligned with each other so that the drill spindle can both drill a hole in the components to be connected and position the connector in the drilled hole with a linear movement along a processing axis. For these operations, the drill spindle moves only along the processing axis, so that a linear drive can be used for these operations.

10 Claims, 4 Drawing Sheets

(56) References Cited

U.S. PATENT DOCUMENTS

| | | |
|---|---|---|
| 10,183,366 B2 | 1/2019 | Sarramoune et al. |
| 2005/0049126 A1* | 3/2005 | Everson ............. B23Q 3/15513 |
| | | 483/47 |
| 2015/0251212 A1* | 9/2015 | Ikeda ........................ B05B 3/02 |
| | | 118/232 |
| 2018/0009074 A1* | 1/2018 | Sarramoune ............. B21J 15/32 |

* cited by examiner

SEALANT APPLICATION STATION AND ASSEMBLY SYSTEM FOR CONNECTING COMPONENTS

TECHNICAL FIELD

The present description relates to manufacturing technology, in particular automated machines, which can be used in a manufacturing process. In particular, the description relates to a sealant application station and an assembly tool as well as an assembly system comprising such a sealant application station and/or such an assembly tool.

TECHNICAL BACKGROUND

Modern assembly processes are characterized by the fact that manual assembly processes are often replaced by an automated solution. The automated solution usually involves the use of appropriate machines that perform the steps to be executed in a predefined sequence.

Decisive criteria for the evaluation of an automated solution in an assembly process include the stability of the automated process, the reproducibility of the individual work steps and the work results, and the verifiability of the quality achieved in the automated processes, for example by means of integrated quality control.

Compared to a manually performed assembly process, an automated solution can lead to an improvement in quality, a decreased lead time and improved reproducibility. Nevertheless, there is also potential for improvement in automated assembly processes by optimizing individual work steps and adapting the tools used.

DESCRIPTION

There may exist a need for improving the automated execution of a process for connecting two components with an assembly system.

In connection with this description, a sealant application station and an assembly tool are described. The sealant application station and the assembly tool can be used together in an assembly system. However, the sealant application station and the assembly tool can also be used separately. For example, the sealant application station can also be used with another assembly tool. Conversely, the assembly tool can also be used with or without the sealant application station.

In the description, both the sealant application station and the assembly tool are described because these two units can interact with each other and because functions of one unit are partly described with reference to functions of the other unit. In this respect, both the sealant application station and the assembly tool are described in the remainder of the description because it helps to understand the overall context.

According to a first aspect, a sealant application station for applying sealant to a connector for joining a workpiece is disclosed. The sealant application station comprises a feeder, a discharger, a support unit, a gripper, a driving unit and a sealant application unit. The feeder is designed to feed a connector to the sealant application station. The discharger is designed to discharge the connector from the sealant application station. The support unit is arranged to hold the connector after feeding via the feeder. The gripper is designed to grip the connector held by the support unit. The driving unit is designed to rotate the gripper around a rotation axis. The sealant application unit is configured to apply a sealant to the connector while the driving unit rotates the gripper about the rotation axis. The support unit is movable to release a discharge opening after the sealant application unit has applied a sealant to the connector.

The sealant application station can be used, for example, in the production of workpieces, in particular for manufacturing steps that include pre-processing of connectors. In the present case, sealant is applied to a connector which is used in a subsequent processing step to connect or join two components to form a part. The connector can be, for example, an impact rivet or a screw rivet, which is applied with sealant before being inserted into an opening in the components to join them together and seal the joint.

The components and the part may, for example, be fuselage components of aircraft that have to be connected to each other in such a way that they are airtight at the connection point. This also applies to the points at which the connectors are arranged. For this reason, a sealant is applied to the connectors before they are inserted into the corresponding openings in the components.

For example, a two-component connector can be used as a sealant. Despite its high hardness, this connector has high elasticity and retains its strength properties over a comparatively wide temperature range, e.g., from −60° C. to +100° C.

The feeder and the discharger can be designed as a standardized tube system through which a connector can be transported by means of vacuum or compressed air. The transport of connectors via a tube system is known in principle. Details of this will not be discussed further here. The connector is transported via the tube system and assumes a specific orientation. A connector in the form of a rivet is preferably transported with the rivet head in front (in the direction of movement). This means that the head of the connector hits the support unit and is then gripped by the gripper in this orientation. The connector retains this basic orientation for further transport via the discharge opening.

The discharge opening is preferably arranged along a feed direction of the connector, so that the connector, after being inserted via the feeder and held and rotated by the gripper, passes into the discharge opening as soon as the support unit releases the discharge opening. This has the advantage that the connector is removed from the feeder, exposed to sealant, and continues on its way towards further processing. No complex transfer mechanisms are required. Instead, the connector is discharged from the feeder, then stopped in its movement by the support unit, and then gripped by the gripper and set in rotation in front of the sealant application unit. Preferably, the connector is rotated about 360° so that it is exposed to sealant in its entire circumferential direction. All that is needed for this process is a drive that rotates the gripper. The gripper does not necessarily have to perform a translatory movement.

The support unit can assume one of two states: in a first state, the support unit blocks the discharge opening and holds a connector that is discharged from the feeder. In this position of the connector, the connector can be gripped and rotated by the gripper; in a second state, the support unit releases the discharge opening, for example by the support unit performing a pivoting motion or a linear motion, which releases the discharge opening; the connector can then be placed in the discharge opening and is transported further for the next processing steps.

The sealant application unit applies the sealant to the connector, for example by pressing or spraying the sealant out of an opening in the sealant application unit. For this purpose, the sealant application unit can be moved to a predefinable distance from the surface of the connector. The sealant is preferably applied in a liquid state to an area of the surface of the connector, for example by means of an opening or nozzle arranged on the sealant application unit. By rotating the connector with the gripper, sealant is preferably applied to the connector in the circumferential direction around the entire circumference and over a specific area in the longitudinal direction.

According to one embodiment, the sealant application station further comprises a transfer station arranged at a discharge end of the feeder and mechanically coupled to the gripper. The driving unit is coupled to the transfer station in such a way that a movement of the driving unit is transmitted to the transfer station, whereby the gripper is rotated about the rotation axis.

For example, the driving unit is coupled to the transfer station via a driving belt. The driving unit can, for example, be an electric motor or another suitable drive. The transfer station is rotatably arranged at one end of the feeder.

For example, the gripper can be rotated in such a way that it performs a 360° clockwise rotation in one processing step (i.e., when applying sealant to a connector) and a 360° counterclockwise rotation in a subsequent processing step (i.e., when applying sealant to the next connector). This reduces the complexity of the rotation mechanism of the transfer station and the gripper, since error-prone components that allow unlimited rotation in the same direction can be dispensed with.

According to another embodiment, the sealant application unit can be moved in the radial direction of the connector to assume a predefinable distance from the connector.

This means that the sealant application unit can be brought to a suitable distance from the surface of the connector before sealant is applied to this surface. For example, this distance can be set or varied depending on the sealant used and the size of the surface area to which sealant is applied.

According to another embodiment, the sealant application station has a sensor unit that is designed to detect the distance between the sealant application unit and the connector or its surface.

The detected distance can be transmitted to a controller of the sealant application station, which enables the controller to adjust the distance between the sealant application unit and the surface of the connector to a desired value by controlling a drive of the sealant application unit accordingly.

According to another embodiment, the gripper has at least two gripper fingers, which are adjustable to a size of the connector to be able to grip connectors with different dimensions.

The at least two gripper fingers are designed to perform a gripping movement. To perform the gripping movement, an actuator (e.g., an electromechanical/hydraulic/pneumatic drive) is coupled to the gripper and the gripper fingers. During the gripping movement, the gripper fingers move towards each other. The actuator can be controlled to stop the gripping movement when a predetermined gripping force applied to the connector is reached. The gripper fingers may be coated or prepared on a gripping surface to grip the connector such that the connector is held securely between the gripper fingers for the duration of the processing steps performed. The gripper fingers can also be moved from an open position to the gripping position by means of a mechanical spring or clamping element. Thus, an actuator is only required to open the gripper fingers, whereas the gripper fingers perform the gripping movement by the spring or clamping element when the actuator no longer holds the gripper fingers in the open state.

According to another embodiment, the gripper holds the connector such that a central axis of the connector coincides with the rotation axis of the gripper.

Thus, the connector does not undergo any translational displacement when the gripper rotates about the rotation axis. Rather, the connector remains in the same location and is rotated only about its central axis, which is aligned with the rotation axis of the gripper. Once the sealant application unit has assumed a predetermined distance from the surface of the connector, this distance is maintained as the gripper rotates with the connector, which is especially true for rotationally symmetrical connectors. The sealant is thus applied over the entire circumference of the connector from the same distance, whereby the sealant is applied in a uniform amount along the entire circumference.

According to another embodiment, the support unit is movable transversely to a transport direction of the connector or to a longitudinal axis of the connector when the connector is in the position held by the gripper to release the discharge opening.

For example, the support unit can be moved from a first state in which it blocks the discharge opening to a second state in which it releases the discharge opening. After the sealant-loaded connector has been removed, the support unit is usually moved from the second state back to the first state. An electromechanical driving unit, a pneumatic unit, a hydraulic unit, a magnetic unit, or some other type of drive may be used for this purpose. The support unit can perform a linear movement or a pivoting movement when moving from the first state to the second state.

In one example, the support unit has an opening that can be brought into overlap with the discharge opening of the sealant application station. In this state, the opening of the support unit is under the connector and the connector is no longer held in position and falls through the opening of the support unit into the discharge opening. In particular, the opening in the support unit can have the same cross-section as the discharge opening.

For a better understanding, an assembly tool is described below which can be used together with the sealant application station in an assembly system.

According to a further aspect, an assembly tool for connecting two components is disclosed. The assembly tool comprises an end effector. The end effector comprises a drill spindle having a drill bit and a dispose finger. The drill spindle is designed to rotate the drill around a processing axis. The dispose finger is designed to pick up a connector from a feeder and bring it into a processing position. The drill spindle is configured to be moved longitudinally along the processing axis. The dispose finger is configured to be moved about a hinge and position the connector so that the connector is axially aligned with the drill. The drill spindle is configured to move along the processing axis to insert the connector into the components and thereby connect them together.

The assembly tool described here is characterized by its simplicity. For example, the drill spindle is moved linearly along a processing axis. The drill spindle can be moved in both directions along the processing axis, for example by an electromechanical drive such as an electric motor or other types of drive described herein (pneumatic, hydraulic, magnetic, etc.).

The drill spindle can therefore be moved along the processing axis towards or away from the two components to be connected. The drill spindle can thus be moved so that the drill bores a hole in the components. Following the drilling process, the drill is returned, i.e., the drill spindle is moved away from the drilled components. During the drilling process, the drill performs a rotation about its longitudinal axis, as usual. The longitudinal axis of the drill coincides with the processing axis of the drill spindle, which means that the drill rotates around the processing axis during the drilling process.

The drill spindle preferably moves in such a way that the drill completely penetrates both components to be connected. The drill is then guided out of the drilled hole by a counter-directional movement along the processing axis and takes up a predetermined distance to the drilled components.

The dispose finger now swivels with the picked-up connector into the processing position. The processing position of the connector is characterized by the fact that the connector is axially aligned with the drill in the processing position. This means that a center axis of the connector coincides with the center axis of the drill. Although the drill and the connector are spaced apart along the processing axis or arranged one behind the other along the processing axis, they are both located on the processing axis. As a result, the connector in this position is also aligned with the hole drilled by the drill.

For example, the connector is at least sectionally (longitudinally) circular or rotationally symmetrical and the circular or rotationally symmetrical longitudinal section has the same or a slightly larger diameter than the drill. In the processing position, the connector is thus also aligned with the hole made by the drill in the components. If the drill spindle is now moved again along the processing axis in the direction of the components to be connected, the connector can be inserted into the hole drilled by the drill.

This approach allows a single drill spindle with a linear movement along a processing axis in both directions to drill a hole in the components to be connected and to insert a connector into the hole drilled by the drill. This greatly reduces the mechanical complexity of the assembly and the processing time. When the dispose finger swivels the connector into the processing position, the drill spindle takes up an appropriate distance to the components to be connected so that the dispose finger with the connector can be swivelled in between the drill and the components to be connected.

The assembly tool described here can be used in a system together with the sealant application station. The sealant application station provides a connector supplied with sealant to the assembly tool, for example via a feeder designed as a vacuum or compressed air transport hose. The connector is then used in the assembly tool as described to connect components to be joined together. However, the assembly tool can also be supplied with a connector in another way; this does not necessarily require the sealant application station described above. According to a further embodiment, the dispose finger is connected to the drill spindle via a hinge, wherein the hinge is configured such that the dispose finger can be pivoted into the processing position in front of the drill and pivoted out of the processing position.

The hinge that connects the dispose finger to the drill spindle is, for example, a swivel or rotation joint. The hinge is arranged on a housing of the drill spindle, for example. When the drill bores a hole in the components to be connected, the dispose finger is swiveled laterally out of the processing position. In this state, the dispose finger can receive a connector from the feeder. After drilling the hole, the drill spindle moves away from the components to be connected and the dispose finger together with the picked-up connector moves in front of the drill.

The dispose finger can be pivoted in the hinge by means of an actuator. The actuator can be a drive as described above with reference to the linear movement of the drill spindle along the processing axis.

According to a further embodiment, the hinge allows pivotal movement about a single axis.

Thus, the dispose finger has a simple structural design, because no complex movement has to be executed during the swiveling movement into and out of the processing position. However, it is of course possible for the dispose finger to execute a different movement pattern during this movement into or out of the processing position, which is adapted to the respective requirements.

According to a further embodiment, the connector and the drill are located on a common axis in the processing position and are arranged one behind the other on this common axis.

It is this relative arrangement of the connector and the drill that allows both the drilling operation and the setting operation to be performed with the same linear movement of the end effector toward (and away from) the processed workpiece. For example, the drill and the connector are arranged relative to each other such that a perpendicular projection (along the processing axis) of the drill and the connector onto the workpiece surface are superimposed or at the same location.

According to another embodiment, the common axis of the connector and the drill is parallel to the processing axis or coincides with the processing axis.

According to a further embodiment, the assembly tool further comprises a kinematic system in the form of a swivel arm, wherein the drill spindle is arranged on the kinematic system.

The kinematic system can, for example, be designed as a so-called six-axis swivel arm. With the aid of the kinematic system, the drill spindle can be moved along the surface of the components to be connected in order to bring the drill spindle to a new working position at which a hole is to be drilled and a connector placed after a connector has been placed in a drilled hole.

Even if the drill spindle is arranged on the kinematic system to be moved to a new working position, the drill spindle only performs a movement along the processing axis at the respective working positions. To drill the hole, the drill spindle is moved along the processing axis towards the components, is then moved away from the components, then the dispose finger with the connector is swiveled into the processing position and the drill spindle is again moved along the processing axis towards the components to insert the connector into the drilled hole. The drill spindle is then moved away from the inserted connector, for example by first moving the drill spindle away from the components along the processing axis and then using the kinematic system to move the drill spindle to the next working position.

According to another embodiment, the assembly tool has a controller and a sensor unit. The sensor unit is designed to detect a relative position of the drill spindle with respect to the two components to be connected and to transmit it to the controller. The controller is designed to initiate a movement of the drill spindle based on the detected relative position of the drill spindle with respect to the components to be connected.

The sensor unit can, for example, have one or more optical sensors arranged on the drill spindle. Alternatively, the sensors can also be arranged on other elements of the assembly tool. However, if the sensors are arranged on the drill spindle, it may be easier to detect the relative position of the drill spindle to the components to be connected because the relative position of the sensors to the drill spindle is fixed. The optical sensors are designed to detect their surroundings. The relative position of the drill spindle to the components to be connected can be detected via certain markers on the components to be connected.

This relative position is passed on to the controller. The controller is designed to control a drive for positioning the drill spindle based on the relative position of the drill spindle and the workpiece (components to be connected). The controller can also be designed to control a drive for the rotation of the drill, for example depending on the distance between drill spindle and workpiece. The controller can be designed to control both the linear drive of the drill spindle for movement along the processing axis towards the workpiece or away from the workpiece and the kinematic system for moving the drill spindle to the next working position.

When the assembly tool and the sealant application station are used together in an assembly system, the functions of the controller of the sealant application station and the functions of the controller of the assembly tool can be performed by a single controller.

According to another aspect, an assembly system is disclosed. The assembly system comprises a sealant application station as described herein and an assembly tool. The assembly tool may be the assembly tool described herein.

The sealant application station and the assembly tool described herein can be used together in an assembly system to join components together. In the sealant application station, a sealant is applied to the connector, and the sealant-applied connector is passed to the assembly tool for use in a joining process of components to be joined together.

The assembly system can be used, for example, in the assembly of aircraft parts. For example, several individual sections of an aircraft skin can be joined together with the assembly tool, using sealant-applied connectors from the sealant application station described herein. Thus, not only are the components to be joined connected mechanically, but the joint area or joint section is sealed gas-tight and water-tight with the sealant.

It should be noted that the sealant application station can also be used independently of the assembly tool in an assembly system to apply a sealant to a connector. Likewise, the assembly tool can be used independently of the sealant application station in an assembly system to connect two or more components. In this connection process, sealant-applied connectors can be used in the same way as connectors that are not sealant-applied. In principle, the connectors can be transferred to the assembly tool in any way.

According to one embodiment, the sealant application station is connected to the assembly tool for feeding a connector with a single feeder tube, wherein the single feeder tube is configured to feed connectors with different dimensions to the assembly tool.

Because connectors with different dimensions can be fed to the assembly tool via the single feeder tube, it is sufficient to use a single feeder tube to connect the sealant application station to the assembly tool. For example, connectors of different diameters and/or different lengths and/or different shapes (in the case of a rivet, shape refers to the shape of the shaft and the head) can be fed via the single feeder tube. This further reduces the complexity of the assembly system because a separate feeder tube is not provided for each variant of the connector.

BRIEF DESCRIPTION OF THE FIGURES

In the following, the attached drawings are used to illustrate examples in more detail. The illustrations are schematic and not to scale. Same reference signs refer to same or similar elements. It is shown in.

DETAILED DESCRIPTION OF EXEMPLARY EMBODIMENTS

Figure 1:
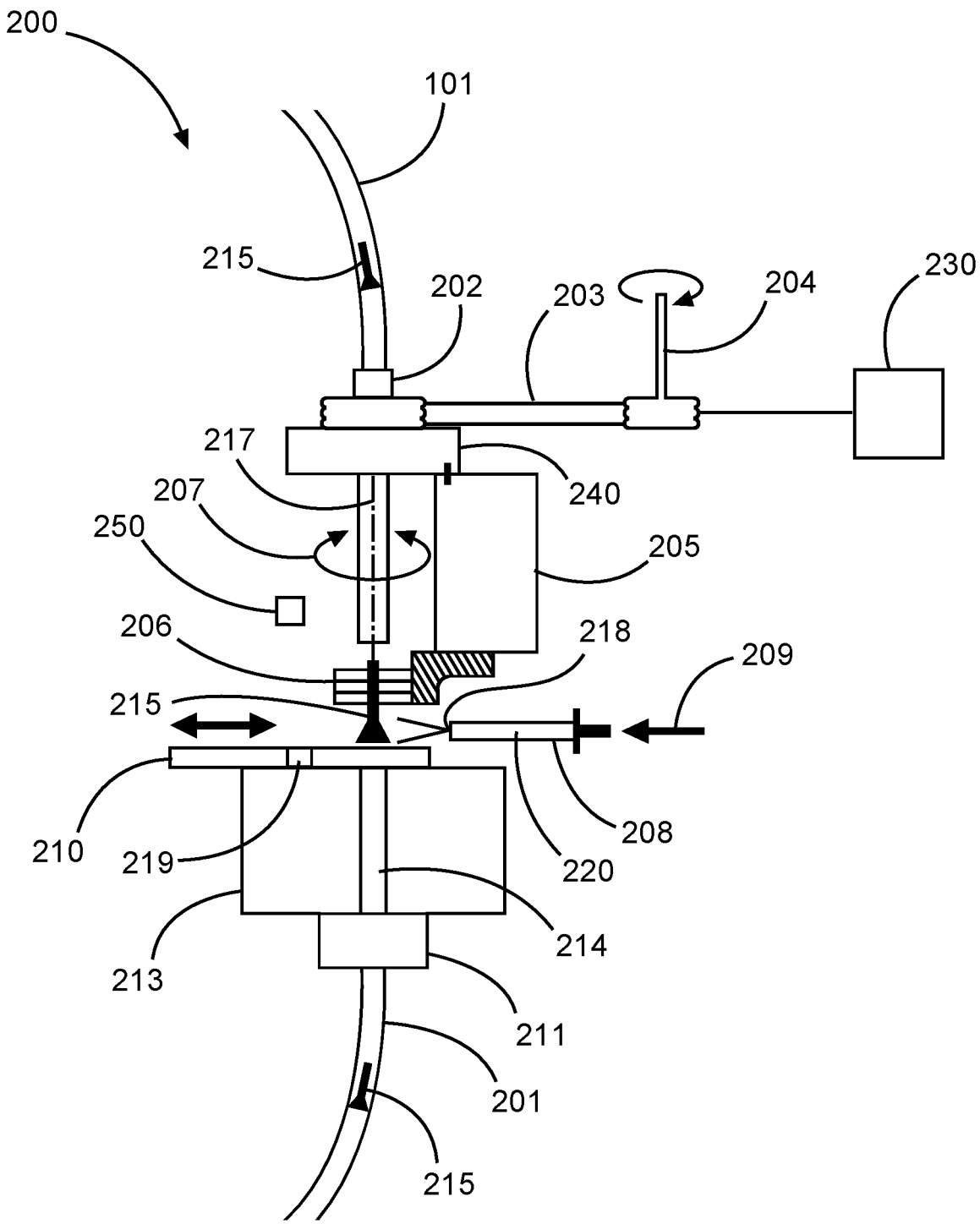
FIG. 1 a schematic representation of a sealant application station in accordance with several embodiments.

FIG. 1 shows a sealant application station 200. The sealant application station 200 is supplied with a connector 215 via a tube system 101. The connector 215 is subjected to the steps described below in the sealant application station 200 and transferred to the tube system 201 for further processing.

The sealant application station 200 comprises a transfer station 202. The connector 215 is fed to the sealant application station 200 via the tube system 101 and the transfer station 202. The transfer station 202 feeds the connector 215 into the sealant application station 200. The sealant application station 200 includes a rotation unit 240 coupled to a gripper 205. The rotation unit 240 can be rotated by a driving unit 204 via a driving belt 203, which also causes the gripper 205 to rotate about the rotation axis 217, which rotation can be in either direction 207 about the rotation axis 217. The gripper 205 includes a plurality of gripper fingers 206 that grip the connector 215.

A connector 215 is fed via the tube system 101 and the transfer station 202 and impinges on the support unit 210. The support unit 210 can, for example, be designed as a stop plate. In this position, the connector 215 is axially aligned with the rotation axis 217, i.e., a central axis or longitudinal axis of the connector 215 coincides with the rotation axis 217, and the connector is gripped by the gripper fingers 206 of the gripper 205. The driving unit 204 rotates the rotation unit 240 and the gripper 205 via the driving belt 203, which also rotates the connector 215 about the rotation axis 217.

The functions of the sealant application station 200, for example the driving unit 204 and the gripper 205, are controlled by a controller 230. However, the controller 230 is also designed to control a movement of the support unit 210 and the sealant application unit 208.

The connector 215 is rotated about the rotation axis 217. During rotation of the connector 215 about the rotation axis 217, a sealant is applied to an area of the surface of the connector 215 by the sealant application unit 208. For this purpose, the sealant application unit 208 may be moved radially in the direction of the connector 215 and may be spaced a predetermined distance from the connector 215. The sealant is applied to the connector 215 via an orifice or nozzle 218. Here, the sealant is extruded with a displacement-controlled extruding force 209.

While the sealant is applied to the connector 215, the connector 215 preferably performs a 360° rotation, whereby the sealant is applied over the entire circumference of the connector 215.

A sensor unit 250 is arranged to sense the distance between the sealant application unit 208 and the connector 215. The sensor unit 250 may also be configured to sense a position and orientation of the connector 215 to enable gripping of the connector 215 with the gripper 205.

Once the sealant has been applied to the connector 215, this step is completed and the connector 215 can be transported further. For this purpose, the support unit 210 is moved to release the discharge opening 214 in the assembly block 213. In the example of FIG. 1, the support unit 210 can be moved to the right to move the opening 219 in the support unit so that the opening 219 is above the discharge opening 214 and the connector 215 falls into the transfer unit 211 where the connector 215 is fed to the tube system 201. However, the support unit 210 can also be moved to the left to clear the discharge opening 214.

Preferably, the sealant application station 200 is arranged to allow gravity to move the connector 215 from the transfer station 202 to its intended position on the support unit 210 and to move the connector 215 to the transfer unit 211 once the discharge opening 214 is released from the support unit 210.

In summary, the function of the sealant application station can be described as follows: the connectors 215 are removed within a tube system 101, 201, transferred to a sealant application unit 208 in order to provide the connector 215 with sealant 220, and transferred back to the tube system for further transport. In the tube system 101, 201, the connector 215 is conveyed, for example, by means of compressed air, to the sealant application station 200 and fixed axially in a fixed position by a horizontally movable pusher (i.e., by the support unit 210). Now the connector 215 is gripped by a radially gripping gripper 205 and its gripping fingers 206 (e.g., in the form of a parallel jaw gripper). The gripper 205 is attached to a rotation unit 240, which now begins to rotate 360°, together with the connector 215 and the gripper. A sealant application unit 208 is delivered to the corresponding connector 215 by means of sensors 250 and either takes a predetermined distance from the connector 215 or rests on the surface of the connector 215. The sealant application unit 208 has, for example, a sealant cartridge which is pressed out by means of a motor. The sealant is conveyed from the sealant cartridge to the connector 215 by means of a cannula. Preferably, the sealant is applied to the connector at a transition between the cylindrical shaft and the head of the connector. Thus, the sealant is protected against abrasion at this point during further transport through the tube system 201. The application of the sealant starts at the beginning of the rotation 207 around the rotation axis 217 and ends after the rotation is completed. The gripper 205 now releases the connector 215 by releasing the gripper fingers so that the connector 215 again remains free on the horizontally movable slide 210. The slide 210 is now moved horizontally and the connector 215 falls axially back into the tube system 201. At the beginning of the vertical movement, the connector 215 is guided axially through the opening 219 and discharge opening 214 by the gripper 205 with the mounted gripper fingers 206.

Since the sealant is applied to the connector and not to the workpiece to be machined, the sealant can be applied selectively and sparingly, and it is ensured that the sealant is also at the point where the surface of the connector 215 is in contact with the machined workpiece.

Thus, the sealant application station 200 described herein is positioned in a tube system 101, 201 that is pressurized with compressed air, and a connector 215 is applied with sealant as it is transported to a device for further processing.

Figure 2:
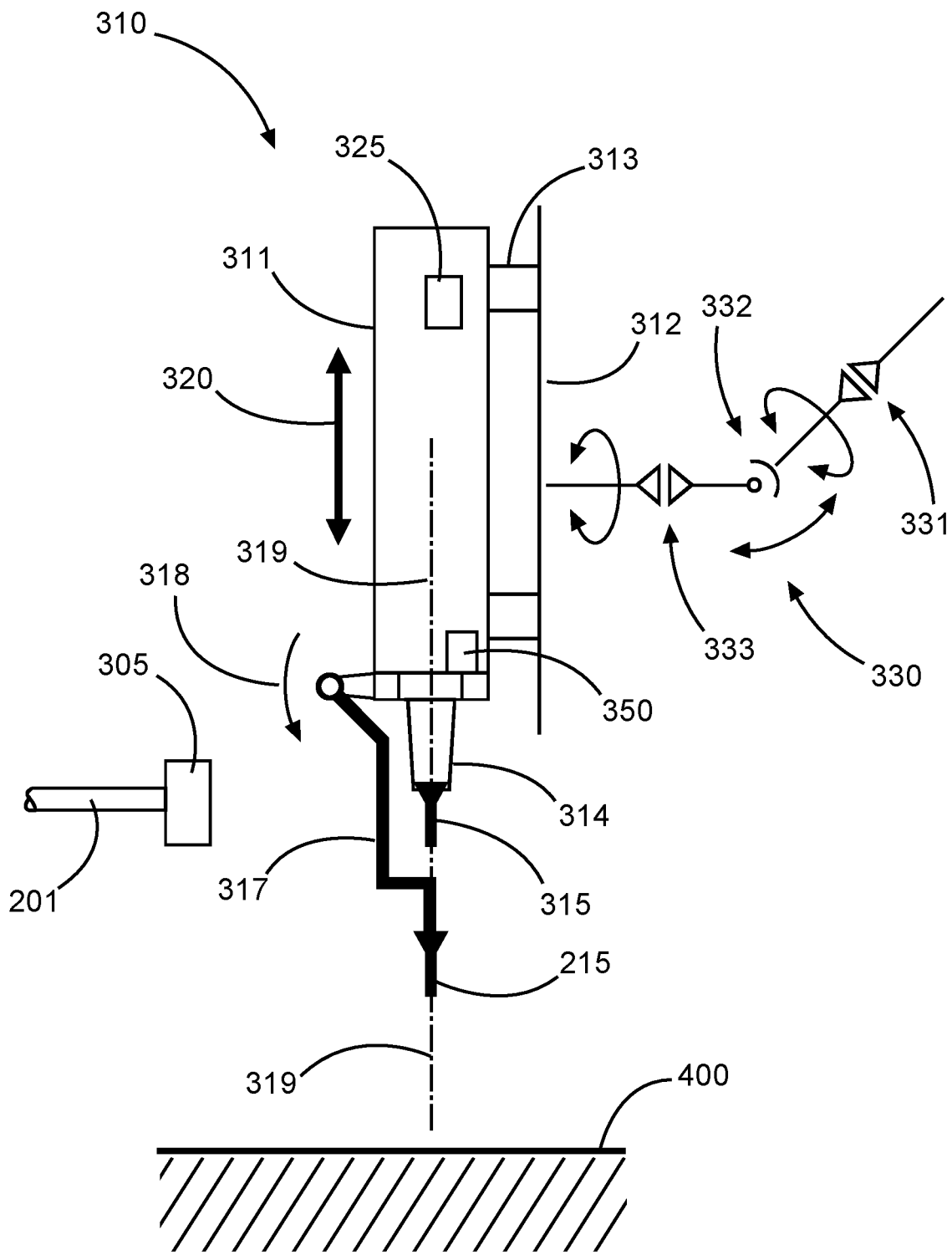
FIG. 2 a schematic representation of an assembly tool in accordance with several embodiments.

FIG. 2 shows an end effector 310 of an assembly tool. The end effector 310 has a drill spindle 311, which is movable in a direction of movement 320 along a processing axis 319 towards or away from a workpiece 400 to be machined. The drill spindle 311 is used to drill a hole in the workpiece 400 to be processed and to insert the connector 215 into the drilled hole. During these two steps, only a linear movement in both directions 320 along the processing axis 319 is performed and, in particular, the drill spindle does not need to be repositioned laterally along the surface of the workpiece 400.

The end effector 310 can, for example, be used together with the sealant application station 200 from FIG. 2. The connector 215 is transported from the sealant application station 200 to the end effector 310 via the tube system 201. The end of the tube system 201 runs onto a transfer station 305. Here, the connector 215 is fed to a vacuum dispose finger 317. The dispose finger 317 holds the connector 215 in position by means of vacuum. The dispose finger 317 can receive different connectors and can be moved to a working position of the dispose finger 317 via a swivel unit or hinge 318.

The drill spindle 311 has a controller 325 and a sensor unit 350. The drill spindle 311 is coupled to a guide element or guide rails 312 via a slide 313. By means of a driving unit (not shown), which can be designed as a spindle drive, the drill spindle 311 can be moved in both directions 320 along the processing axis 319. During this movement, the drill spindle moves towards or away from the workpiece 400. The driving unit is controlled by the controller 325.

The drill spindle includes a drill chuck 314 and a drill 315. The drill 315 is positioned so that its longitudinal axis or center axis coincides with the processing axis 319. Presently, any drill 315 configured to drill a hole in the workpiece 400 may be used. To drill a hole in the workpiece 400, the drill spindle 311 is moved in the direction of the workpiece 400 until the drill reaches a desired depth in the workpiece 400. The drill spindle 311 is then moved linearly away from the workpiece 400 along the processing axis 319 to bring the drill bit to an appropriate distance from the surface of the workpiece 400. Now, the dispose finger 317 can pivot into the processing position together with the received connector 215. In the processing position, the connector 215 is axially aligned with the drill 315 and the center axis of the connector 215 coincides with the center axis of the drill, with the connector 215 disposed along the processing axis 319 between the drill and the workpiece. The drill spindle 311 can again be moved toward the workpiece 400 with the connector 215 so positioned to insert the connector 215 into the hole drilled by the drill. Finally, the connector is released from the dispose finger and the drill spindle is moved to a new working position.

The drill spindle 311 is connected to a kinematic system 330. The kinematic system 330 is configured to move the drill spindle 311 from the current working position to a new working position after performing the steps described above. During this process, the sensor unit 350 may sense the position of the drill spindle 311 relative to the workpiece 400 and transmit corresponding position information to the controller 325. The controller 325 can then control the kinematic system 330 accordingly to move the drill spindle to the desired working position in order to drill a hole and set a connector there again.

For example, the kinematic system 330 is a structure having a plurality of joints, each of which is movable about at least one axis. For example, the kinematic system 330 has three joints 331, 332, 333, each of which is pivotable or rotatable about an axis. The kinematic system 330 may, of course, include other joints not shown to place the drill spindle 311 as desired.

In particular, it is pointed out that the kinematic system 330 is only used for moving to a new working position of the drill spindle 311. Here, the working position is understood to be the position of the drill spindle along the surface of the workpiece 400, this working position being reached in particular by a lateral movement of the drill spindle, which, however, does not exclude other movement patterns of the kinematic system 330. As soon as the drill spindle 311 has reached this new working position, a movement of the drill spindle 311 for drilling the hole in the workpiece 400 and placing the connector 215 in the hole takes place only along the processing axis 319, which runs orthogonally with respect to a surface of the workpiece 400, for example.

The mode of operation of the end effector 310 can be summarized as follows: a vacuum-actuated dispose unit 317 picks up the connector 215 from the tube system 201. In this step, the dispose unit 317 is pivoted to a position in which it protrudes laterally from the drill spindle 311 or, in any case, is not located between the drill and the workpiece. From this position, in which the dispose unit 317 receives the connector 215, the dispose unit can be pivoted between the drill and the workpiece after the drill has drilled a hole in the workpiece. The tube system 201 guides the sealant-loaded connector 215 head first to the transfer station 305. At this point, the dispose unit 317 takes over the connector 215. The connector, for example a rivet, rests head first on the dispose unit 317 and is sucked in and held against the dispose unit 317 by means of negative pressure or vacuum. Once the dispose unit 317 has sucked in the connector, the transfer station 305 is moved away from the dispose unit 317 so that the dispose unit can perform a pivoting motion together with the connector to bring the connector between the drill and the workpiece. From this position, the connector can be inserted orthogonally into the hole located in the workpiece by moving the drill spindle 311 along the processing axis 319 toward the workpiece. The vacuum in the dispose unit 317 is now released, releasing the connector 215, and the drill spindle 311 is moved away from the workpiece and moves to the new working position.

Following these steps, measured values and machine data acquired by means of the sensor unit 350 can be transmitted to the controller 325 in order to evaluate and display the drilling and setting quality of a connection. For this purpose, the sensor unit can, for example, record a course of movement of the drill spindle along the processing axis 319 together with a required drive power to move the drill spindle along the processing axis 319. Thus, it can be displayed with which force the hole was drilled and with which force the connector was inserted into the hole. From this data, conclusions can be drawn about the quality and strength of the connection made.

The sensor unit 350 can also be used to make a correction to a working position for the drill spindle after it has moved to that position. When the kinematic system 330 moves the drill spindle 311 to a new working position, the sensor unit 350 can detect the relative position between the drill spindle and the surface of the workpiece and correct this relative position if necessary. For this purpose, the sensor unit 350 can, for example, detect a marker/pre-drill/staple rivet on the surface of the workpiece 400 and thereby infer the relative position between the drill spindle and the workpiece.

The drill spindle can have one or more outlets for compressed air, via which compressed air is emitted when the drill spindle approaches the surface of the workpiece in order to remove contaminants from the surface of the workpiece. The impurities can also be sucked off the surface of the workpiece. In particular, this operation can be performed after drilling a hole in the workpiece and before placing the connector in the drilled hole.

The drill spindle may include a foot that seats on the surface of the workpiece when drilling a hole and setting a connector into the workpiece. The foot may be placed on the surface of the workpiece by, for example, pneumatic cylinders and/or kinematic system 330 and may apply a process force or holding force to the workpiece 400 to hold the workpiece 400 in place for the steps of drilling and setting the connector 215.

The drill spindle may be moved relative to the foot along the processing axis 319 to drill the hole and set the connector. The outlets for compressed air may also be arranged to clean a bearing surface of the foot prior to placement on the surface of the workpiece.

When the drill spindle 311 is moved with the spindle drive towards the workpiece 400 to drill the hole, a drive of the drill is activated. After drilling the hole in the workpiece 400 and when placing the connector in the hole, the drill spindle is not activated.

Figure 3:
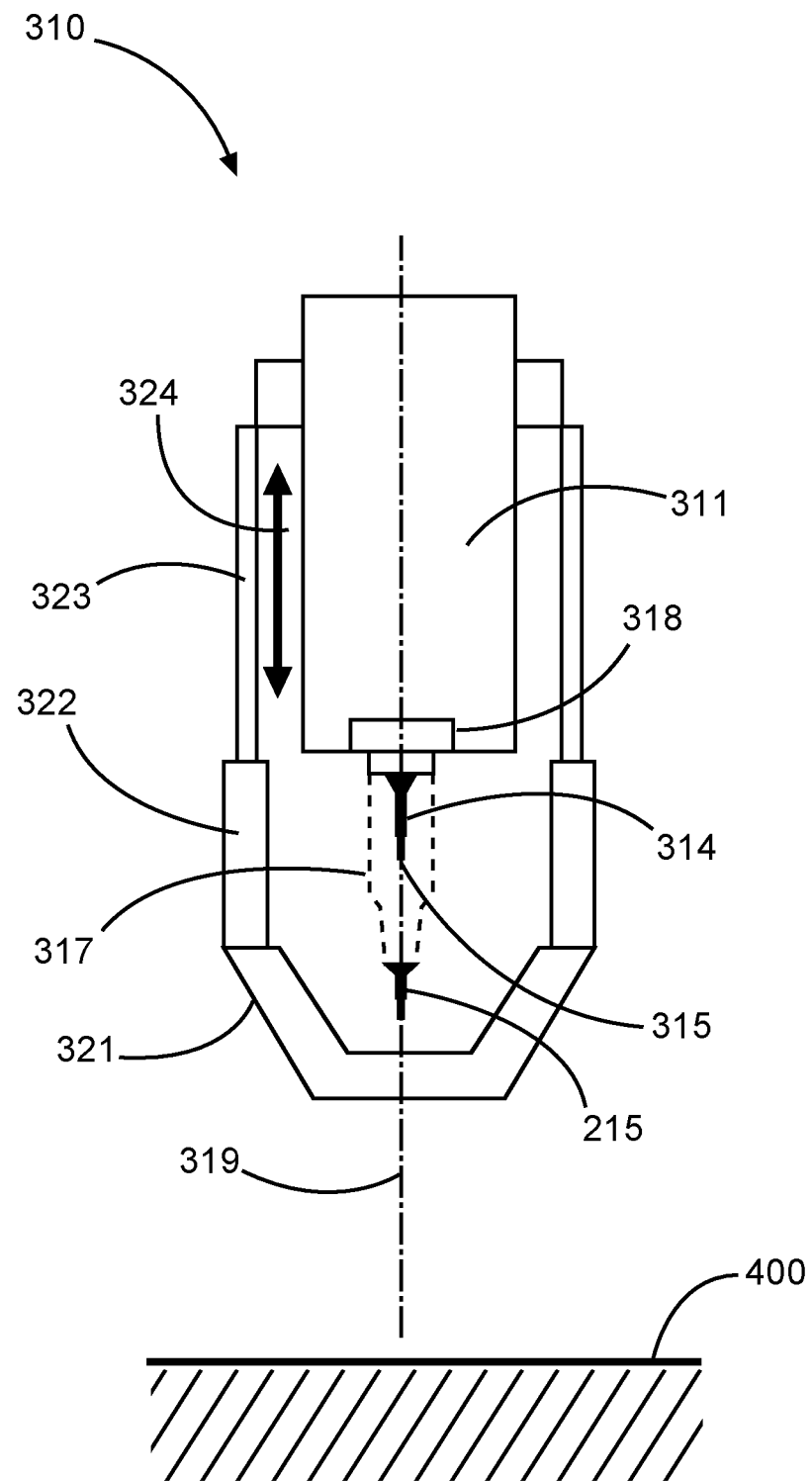
FIG. 3 a schematic representation of an end effector with presser foot in accordance with several embodiments.

FIG. 3 shows a schematic representation of an end effector 310 with a presser foot 321. The perspective of FIG. 3 is such that the dispose finger 317 is in front in the viewing direction, which is why the dispose finger 317 is drawn in dashed lines. With regard to the description of the drill spindle 311, the hinge 318 together with the dispose finger 317, the drill chuck 314 and the drill 315, as well as the function of the dispose finger 317 for placing the connector 215, reference is made to the previous description, in particular to FIG. 2.

The presser foot 321 is arranged in axial extension of the drill spindle 311 in the direction of the workpiece 400. The presser foot 321 is coupled to a piston rod 323 via a cylinder 322. By means of the piston rod 323, the presser foot 321 can be moved along the processing axis 319 and along the direction of movement 324 in order to place the end effector 310 on the workpiece 400 and to perform the work steps described above (drilling, setting connector). The presser foot 321 rests on the workpiece 400 with an outer lower surface. The drill spindle 311 is movable relative to the piston rod 323, the cylinder 322 and the presser foot 321 along the processing axis 319 in both directions, as indicated by the arrow 324. After the presser foot 321 is placed on the workpiece, the drill spindle 311 moves to the workpiece, drills the hole, and places the connector therein, as described above. The presser foot 321 is configured on its lower surface so that the drill and the dispose finger with the connector have access to the surface of the workpiece 400 to drill the hole at the intended position and place the connector.

Figure 4:
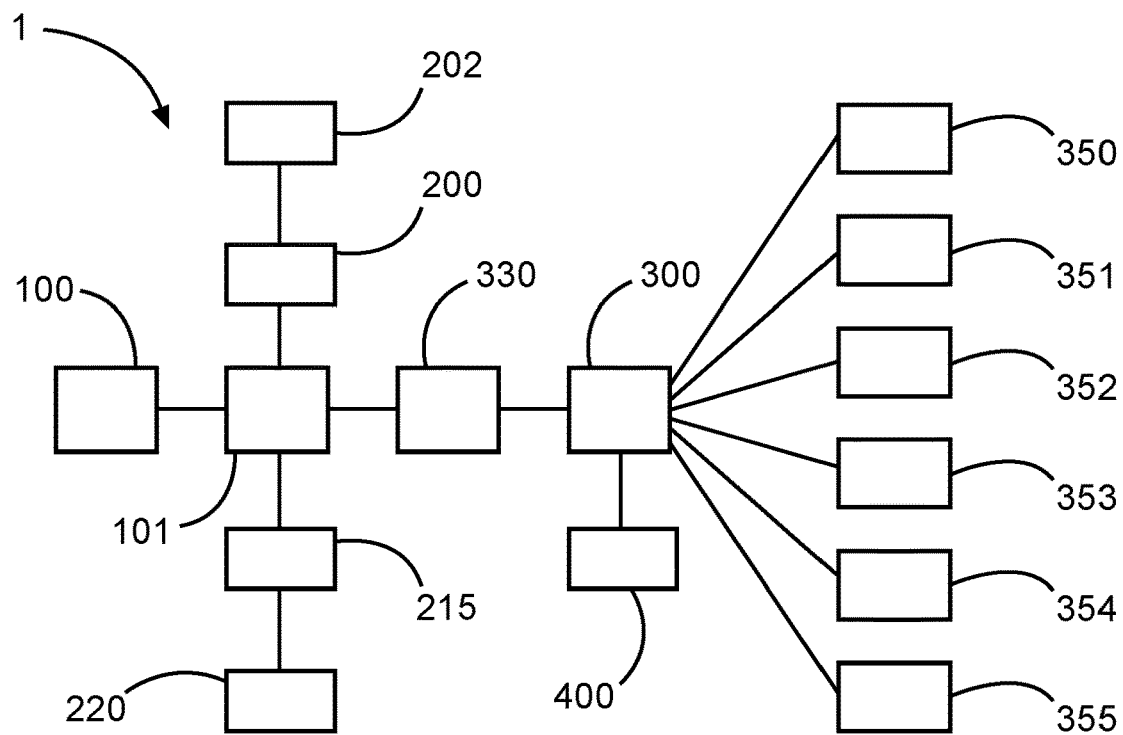
FIG. 4 a schematic representation of the structure of an assembly system in accordance with several embodiments.

FIG. 4 is a schematic representation of the functional blocks of an assembly system 1 comprising a sealant application station 200 as shown in FIG. 1 and an assembly tool 300 as shown in FIG. 2.

The assembly system 1 comprises a separation arrangement 100 for providing connectors. The connectors 215 are fed to the sealant application station 200 via a tube system 101. At the sealant application station 200, the connector 215 first arrives at the transfer station 202 and is made available for the subsequent work steps. In particular, sealant 220 is applied to the connector 215 at the sealant application station 201.

The kinematic system 330 moves the drill spindle of the assembly tool 300 to a desired working position with reference to the workpiece 400. At this working position, the sensor unit 350 is used to adjust the working position with reference to the workpiece 400 if necessary. Then, at 351, the multifunctional presser foot 321 (see FIG. 3) is controlled to prepare the drill spindle with reference to the workpiece 400 for drilling the workpiece 400 and setting the connector 215. At 352, the dispose finger 317 is actuated to pick up a connector 215 from the transfer station 305. At 353, drill spindle 311 is moved along processing axis 319 to drill a hole in the workpiece 400 and insert the connector into the hole. At this point, it should be noted that the connector 215 may be picked up at the transfer station 305 by the dispose unit 317 before or after the drill spindle 311 drills the hole in the workpiece 400 with the drill 315. At 354, the drill spindle is controlled according to the specifications of a process to drill the hole and insert the connector into the drilled hole. Finally, at 355, the process data acquired with the sensor unit is transmitted to the controller and evaluated.

In particular, the functions described herein with reference to functional blocks 350 through 355 are performed as method by the controller 325.

With further reference to FIG. 4, the interaction between assembly tool 300, sealant application station 200 and separation arrangement 100 is described. A compressed air tube system 101 is used for feeding the connector 215 and transports the connector 215 from the separation arrangement 100 to the sealant application station 200. The separation arrangement 100 can be designed to provide connectors 215 of different shapes and dimensions. The assembly tool 300 requests a particular connector 215 from the separation arrangement 100. The separation arrangement 100 feeds the requested connector into the tube system 101 via a turret. The requested and provided connector is fed into the tube system 101 with the head oriented in the direction of conveyance. The transport of the connector 215 within the tube system 101 takes place with compressed air. The connector 215 then travels through the sealant application station 200 and via the tube system 201 to the assembly tool 300, where the steps described with reference to FIG. 1 and FIG. 2 are performed.

Figure 5:
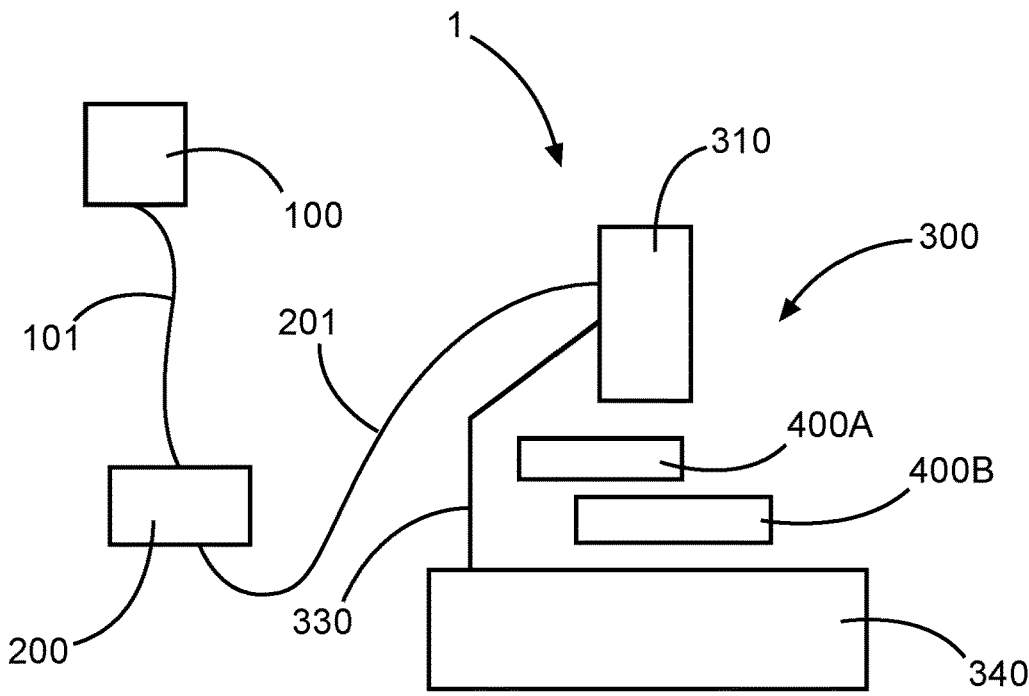
FIG. 5 a schematic representation of an assembly system in accordance with several embodiments.

FIG. 5 describes an assembly system 1 comprising the sealant application station 200 as shown in FIG. 1 and the end effector 310 as shown in FIG. 2. FIG. 5 shows the structural design of the assembly system 1, with those elements shown here that correspond to the function blocks shown in FIG. 4.

The separation arrangement 100 provides several different connectors, which are transferred to the sealant application station 200 via the tube system 101. At the sealant application station 200, sealant is applied to a connector. The sealant-applied connector is transported from the sealant application station 200 to the end effector 310 via a single tube 201. The tube 201 is designed to transport connectors of different shapes and dimensions, so that only a single tube 201 is used for different connectors. The end effector 310 drills a hole in the components 400A and 400B and connects these components by inserting a connector into the drilled hole.

The components 400A, 400B represent the workpiece that is processed by the assembly system. The two components at least partially overlap each other. A presser foot applies a processing force to at least one of the two components, and the end effector is then moved linearly along the processing axis 319 as described with reference to FIG. 2 to both drill a hole in the two components and insert the connector into the drilled hole. During these steps, the components 400A, 400B rest on an assembly table 340 or corresponding counter holder, which in turn is guided and fed by a second kinematic system. For example, the counter holder can be designed to screw on a screw nut for the connector with a rotating device, which can also be referred to as an automatic drilling unit, ADU, so that the counter holder can on the one hand apply a process force for clamping 400A and 400B, and on the other hand provide a connector with a nut. The end effector 310 is then moved to a new working position by means of the kinematic system 330 when a connection has been made between the two components at one point. Although FIG. 5 illustrates that the kinematic system 330 is attached to the assembly table 340, the kinematic system 330 may be attached elsewhere.

Additionally, it should be noted that "including" or "comprising" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be construed as a limitation.

LIST OF REFERENCE SIGNS 1 assembly system
100 separation arrangement
101 tube system
200 sealant application station
201 tube system, e.g. standard pneumatic feed tube
202 transfer station
203 driving belt
204 driving unit
205 gripper, e.g. parallel jaw gripper
206 gripper finger, e.g., rake gripper, adjustable to connector diameter
207 rotation direction
208 sealant application unit, cartridge with needle
209 direction of squeezing force, radial direction
210 movable support unit
211 transfer unit
213 assembly block
214 discharge opening
215 connector
216 movement direction
217 rotational axis
218 nozzle
219 opening
220 sealant
230 controller
240 rotation unit
250 sensor unit
300 assembly tool
305 transfer station
310 end effector
311 drill spindle
312 guide element, guide rails
313 sled
314 drill chuck
315 drill
317 dispose finger
318 hinge (swivel or rotational joint)
319 processing axis
320 movement direction along processing axis
321 presser foot
322 cylinder
323 piston rod

324 movement direction
325 controller
330 kinematic system
331 first hinge with axle
332 second hinge with axle
333 third hinge with axle
340 assembly table
350 sensor unit with positioning
351 controller of the multifunctional presser foot
352 dispose unit incl. rotation unit
353 linear drive with spindle drive for infeed of drill spindle and dispose unit
354 drill spindle unit
355 process data evaluation
400 Workpiece

The invention claimed is:

1. A sealant application station for applying sealant to a connector to join a workpiece, the sealant application station comprising:
    a feeder configured to feed a connector to the sealant application station;
    a discharger configured to discharge the connector from the sealant application station;
    a support unit arranged to hold the connector after feeding over the feeder;
    a gripper configured to grip the connector held by the support unit;
    a driving unit configured to rotate the gripper about a rotation axis; and
    a sealant application unit configured to apply a sealant to the connector while the driving unit rotates the gripper about the rotation axis;
    wherein the support unit is movable to expose a discharge opening after the sealant application unit has applied a sealant to the connector.

2. The sealant application station according to claim 1, further comprising a transfer station disposed at a discharge end of the feeder and mechanically coupled to the gripper;
    wherein the driving unit is coupled to the transfer station such that movement of the driving unit is transmitted to the transfer station, thereby rotating the gripper about the rotation axis.

3. The sealant application station according to claim 1, wherein the sealant application unit is movable in radial direction of the connector to assume a predeterminable distance to the connector.

4. The sealant application station according to claim 3, further comprising a sensor unit configured to sense the distance between the sealant application unit and the connector.

5. The sealant application station according to claim 1, wherein the gripper has at least two gripper fingers adjustable to a size of the connector to grip connectors of different dimensions.

6. The sealant application station according to claim 1, wherein the gripper is configured to hold the connector such that a central axis of the connector coincides with the rotation axis of the gripper.

7. The sealant application station according to claim 1, wherein the support unit is movable transversely to a transport direction of the connector to expose the discharge opening.

8. An assembly system, comprising:
    the sealant application station according to claim 1; and
    an assembly tool for processing the connector in a work process.

9. The assembly system according to claim 8, wherein the assembly tool is configured to connect two components and comprises an end effector, the end effector comprising:
    a drill spindle with a drill, the drill spindle-being configured to rotate the drill about a processing axis; and
    a dispose finger configured to receive the connector from the discharger and move the connector into a processing position;
    wherein the drill spindle is configured to be moved longitudinally along the processing axis;
    wherein the dispose finger is configured to be moved about a hinge and to position the connector such that the connector is axially aligned with the drill; and
    wherein the drill spindle is configured to insert the connector into the components by movement along the processing axis, thereby connecting the components together.

10. The assembly system according to claim 9, wherein the sealant application station is connected to the assembly tool for feeding the connector with the discharger, wherein the discharger comprises a single feeder tube; and
    wherein the single feeder tube is configured to feed connectors with different dimensions to the assembly tool.

* * * * *